United States Patent Office 2,733,953
Patented Feb. 7, 1956

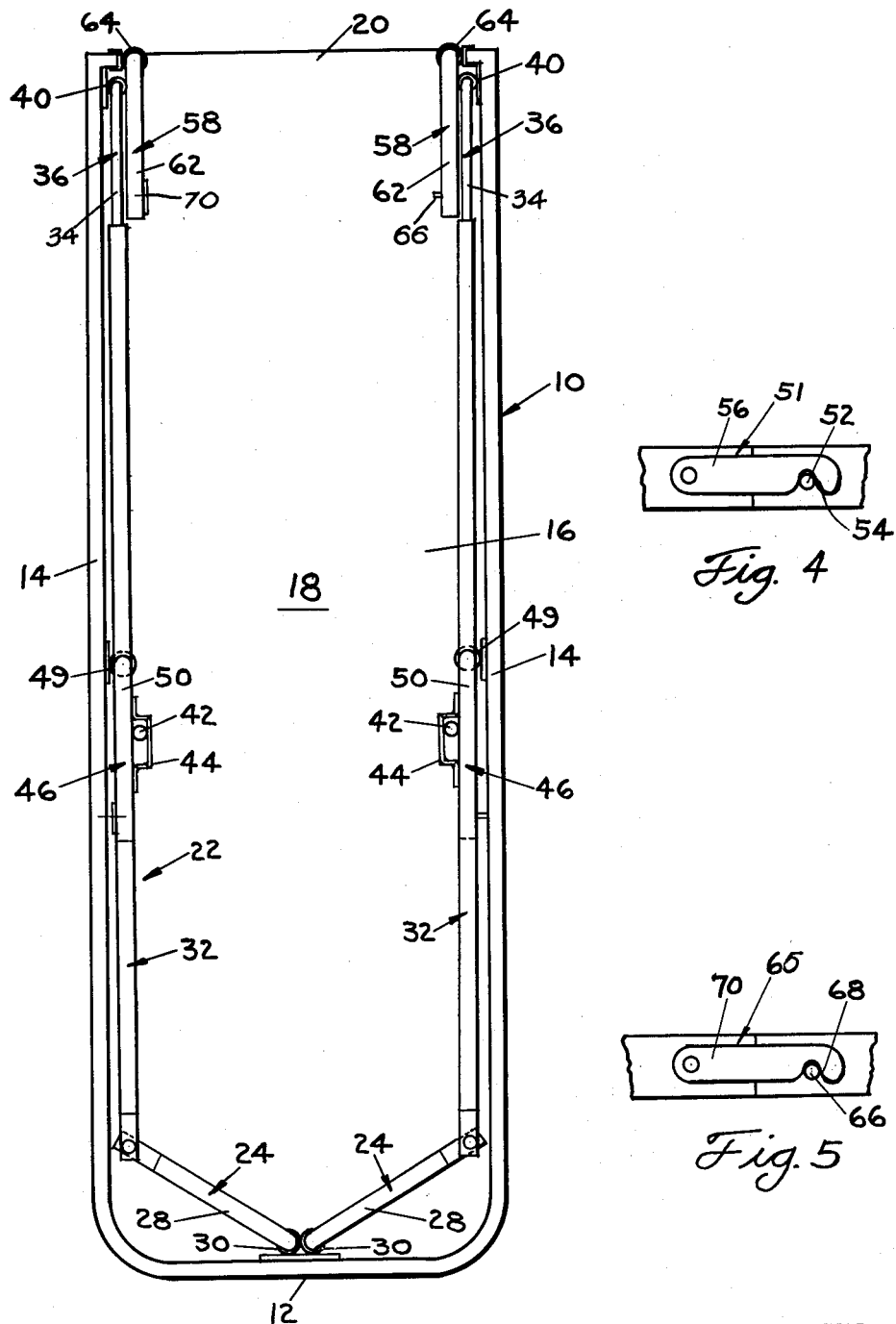

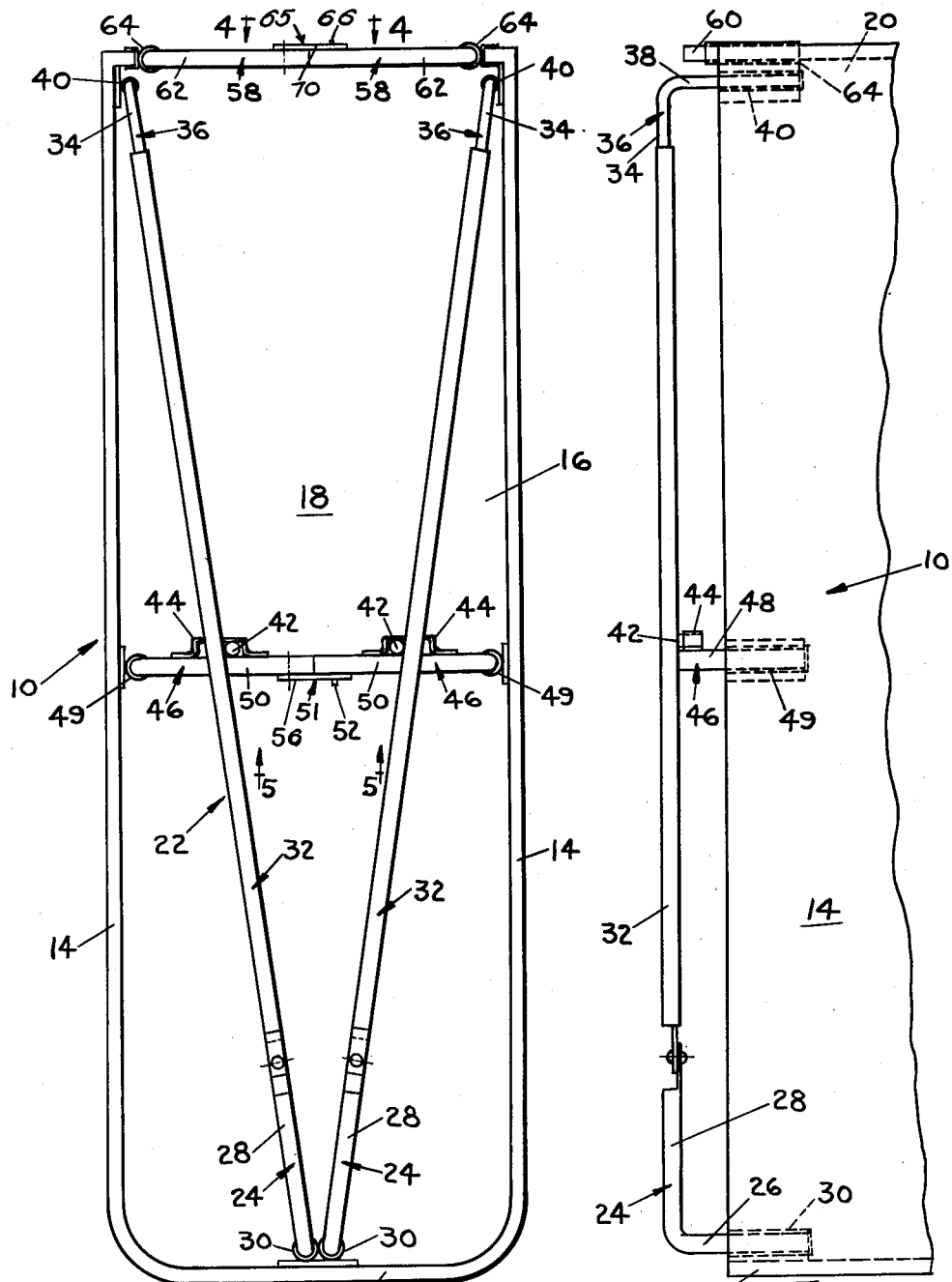

2,733,953

VEHICLE TARPAULIN SUPPORT

Andrew J. Nenadal, Cleveland, Ohio

Application December 24, 1951, Serial No. 263,082

11 Claims. (Cl. 296—100)

This invention relates to vehicles of the load carrying type and more particularly to tarpaulin supporting mechanism for open top vehicle bodies.

Broadly the invention comprehends the provision of a vehicle body tarpaulin supporting mechanism that can be moved to one position for supporting a tarpaulin over an open top type vehicle body or to a collapsed position to give full access to the opening in the top of the vehicle body.

Among the principal objects of the invention is the provision of a tarpaulin supporting mechanism for open top vehicle bodies that;

1. Is relatively simple and economical of construction and effective in use;

2. Is capable of supporting a tarpaulin over the open top of the vehicle body for protecting a load carried within the body;

3. Includes means adapted to be positioned across the opening in the top of the vehicle body for supporting a tarpaulin applied over the opening in the vehicle body and which means is capable of being moved out of the opening to permit of applying a load to or removal thereof from the vehicle body by mechanism moving centrally of the vehicle body;

4. Includes combination pivotal and telescoping members movable to a position to extend across the opening in the top of an open top vehicle body, and other pivotal members engageable and associated therewith for effectively supporting a tarpaulin and which members are movable to positions adjacent the closed end and sides of the vehicle body; and 5. Can be easily and readily moved to operative or collapsed position by an average person.

Other objects and advantages of the invention will appear from the accompanying drawings taken in connection with the description thereof, and in which:

Fig. 1 is a top elevation view of an open top vehicle body with the tarpaulin supporting mechanism therefor in collapsed position thereon;

Fig. 2 is a view similar to Fig. 1 with the tarpaulin supporting mechanism in tarpaulin supporting position;

Fig. 3 is a fragmentary side elevation view of Fig. 2;

Fig. 4 is a fragmentary end elevation view of a latch taken substantially along the lines 4—4 of Fig. 2;

Fig. 5 is a fragmentary end elevation view of a latch taken substantially along lines 5—5 of Fig. 2.

Similar numerals throughout the several views of the drawings designate like elements.

This tarpaulin supporting mechanism was devised primarily for the purpose of providing a feasible means of supporting a tarpaulin over a load carrying open end and open top vehicle body. The mechanism in addition to being capable of supporting a tarpaulin applied over the vehicle body is capable of movement as a permanent part of the vehicle body to an out of the way position adjacent the one closed end and sides of the body thereby making the opening of the body top accessible for the application of heavy or large loads to and removal thereof from the vehicle body. By means of a prearrangement of telescoping and pivoted members the mechanism can be easily and quickly moved from open to closed positions by an individual merely by the simple manual movement of the interconnected members.

Referring to the drawings for more specific details of the invention 10 represents generally a vehicle having a closed end 12, a pair of parallel sides 14 connected thereto and a floor 16 providing an open top 18 and an open end 20 opposite the closed end 12.

A tarpaulin supporting mechanism 22 is supported on the end 12 and sides 14 of the vehicle body near the top thereof.

The mechanism includes a pair of identical links 24 each of tubular or rod structure and including right angle legs 26 and 28, with the leg 26 of each link pivoted in a stationary bracket 30 fixedly secured on the inner wall of closed end 12 of the body such that the brackets 30 are positioned side by side near the middle of the closed end 12 of the body.

The leg 28 of each link extends horizontally in substantially parallel array to a plane of the top of the vehicle body with the free end of the leg 28 of each link 24 having a tubular link 32 pivotally connected thereto and extending in horizontal array therewith, and each link 32 receives in telescoping relation therein one end of a leg 32 of a link rod 36 whereas the other end of a leg 38 of the rod 36 arranged at right angles to leg 34 is pivotally mounted in a stationary bracket 40. The brackets 40 are fixedly secured to the inner wall of the respective sides 14 of the body near the open end thereof adjacent the open top.

A pin 42 welded or otherwise fixedly secured to each of the links 24 substantially intermediate the length thereof and extending vertically thereto beyond the lower surface thereof is received in a slotted bracket 44 secured to one side of a cross piece or bar 46. Each cross piece or bar 46 includes a leg 48 pivotally mounted in a stationary bracket 49 secured to the inner wall of side 14 substantially intermediate the length thereof and adjacent the open top of the body, and a leg 50 integral with and extending at right angles to leg 48 in a horizontal direction. The cross pieces as shown by Fig. 2 are adapted to be of a length such that upon the pivoting thereof toward one another the free ends of legs 50 thereof come together so as to bridge the opening between the side walls. A clamp or latch 51 including a pin 52 on one side of leg 50 of one cross piece 46 is engaged by a notch 54 provided in the free end of a link 56 pivotally mounted on one side of the other cross piece 46.

A pair of similar cross pieces or bars 58 each including right angle legs 60 and 62 are arranged near the open end of the vehicle body with the leg 60 of each cross piece pivotally mounted in a stationary bracket 64 fixedly secured adjacent the open end and top of the body. The legs 62 of the cross pieces 58 are adapted as disclosed by Fig. 2 to extend toward one another with their free ends in engagement to afford a supporting cross bar for the body tarpaulin at the open end thereof. A latch 65 such as latch 51 includes a pin 66 fixedly mounted on one side of leg 62 of one cross piece adapted to be received in a notch 68 provided in the free end of a link 70 pivotally secured to one side of the leg 62 of the other cross piece 58.

As viewed in Figs. 2 and 3 the mechanism is arranged in tarpaulin supporting position wherein the leg 28 of each link 24 is lineally extensive with the respectively pivoted link 32 and link 36 wherein with the links 24 and 32 so extended and with the links 36 telescopically received in the links 32 a V-shaped supporting structure is provided. With the links so arranged the cross pieces extend horizontally toward one another and as held together by the latch 51 provide for the support of the V-shaped structure intermediate the length thereof, wherein in addition to the links 24 and 36 being capable by way of their respective pivotal support on the body to support the extended connections thereof by way of links 32, the links 32 rest upon the assembled cross pieces 46. The cross pieces 46 by way of their bracket and pin connection are moved to the position bridging the opening 18 in the top of the vehicle body since as the pin 42 slides in the slot of bracket 44 as the link 32 is moved to the position of Fig. 2 a pivotal action of the cross pieces is accomplished to bring them together.

When it is desired to clear the major part of the opening 18 in the top of the vehicle body the latches 51 and 64 are opened whereupon the legs 62 of the cross pieces 58 are pivotal away from one another toward the inner wall of the respective sides 14. With the latch 51 released and the cross pieces 58 manually moved about their separate pivots, the cross pieces by way of their sliding connection with the links 32 wherein pins 42 slide in the slots formed by brackets 44 effect a simultaneous movement of the links 32 about their pivots with links 24, whereupon by way of the links 24 and 36 also being pivotal, the links 32 and 36 are moved into close proximity to the inner wall of the sides 14 whereas the links 24 are pivoted toward the closed end 12 of the vehicle body.

With the mechanism collapsed as disclosed by Fig. 1, free access is had by way of the open end 20 and open top 18 of the vehicle.

Fig. 3 clearly illustrates the horizontal array of the supporting links of the mechanism wherein the tarpaulin is supported at a point above the top edge of the end and sides of the vehicle body. If need be to accommodate a piece of merchandise of abnormal heighth as compared to the heighth of the sides and end of the body the pivotal legs of the links 24 and 36 and legs of the cross pieces 46 can be raised vertically to an amount ample to clear the merchandise to be carried.

In addition to the fact that the mechanism is readily movable to open or closed position as may be the required case, it can be readily removed from its supported position in the vehicle body for the servicing thereof.

While the invention has been disclosed in connction with certain specific embodiments of structure, it is conceivable of being readily adaptable to structural modification without departing from the basic concepts taught hereby. Accordingly, the invention is to be interpreted in the light of the appended claims.

What I claim is:

1. A tarpaulin supporting mechanism comprising a pair of linkage means, each including one link having one end pivotally supported adjacent one end of a like link of the other linkage means, a second link means having one end pivoted to the free end of the first link, and with its other end pivotally supported in spaced relation to one end of a like link means of the other linkage means, each of said second link means including longitudinally slidable members, a pair of cross bars having one end of each pivoted at spaced points lying in a line intermediate the adjacent and spaced pivots of the linkage means and with the opposite ends of each cross bar adapted to pivot toward one another into lineal alignment, and means, interconnecting said second link means respectively with the cross bars, including an element on each second link means slidably received in a slot in its associated cross bar such that movement of the cross bars to lineal alignment moves the links of the respective linkage means to lineal alignment and movement of the cross bars to positions parallel to one another moves the linkage means to U-shape form.

2. A tarpaulin supporting mechanism comprising a pair of linkage means with the opposite ends of each linkage means being pivotally supported, each linkage means intermediate the opposite end pivots thereof including a plurality of parts movable in a single horizontal plane and with the pivotally supported opposite end portions of the linkage means being arranged perpendicular to said plane, some being pivoted and others slidably interconnected whereby each linkage means can extend lineally between the pivotally supported opposite ends thereof or be moved to a position out of lineal extension between the pivotally supported opposite ends thereof.

3. A mechanism according to claim 2 wherein a pair of cross bars are provided having one end of each pivoted at spaced points lying in a line intermediate the adjacent and spaced pivotally supported ends of the linkage means, wherein means are provided interconnecting each of the linkage means with respective cross bars, and wherein the one pivotally supported end of each linkage means are adjacent one another, with the opposite pivotally supported ends of each linkage means spaced from one another.

4. A tarpaulin supporting mechanism comprising a pair of linkage means with one end of each means arranged adjacent one another, and with the opposite ends of each means arranged in spaced relation to one another, said means each including a member pivotally mounted at one extremity thereof and constituting said one end of the means, a second member pivotally mounted at one extremity thereof to the free end of the first member and a third member pivoted at one extremity thereof constituting the opposite end of the means and slidably engageable at its free end with the free end of the second member, a pair of cross bars having one end of each pivoted at spaced points and lying in a line intermediate the adjacent and spaced pivots of the linkage means and with the opposite ends of each cross bar adapted to pivot toward one another into lineal alignment, and means interconnecting the second member of each of the linkage means respectively with one of the cross bars.

5. A mechanism according to claim 4, wherein the linkage means and cross bars are movable in horizontal planes parallel to one another.

6. A mechanism according to claim 4, wherein the linkage means are supported upon the cross bars.

7. A mechanism according to claim 4, wherein the mechanism is mounted upon a vehicle body having a floor, a pair of parallel and spaced vertical sides and a vertical end wall connected between the sides at one end thereof, and wherein said one extremity of the first member of each linkage means is pivotally supported near the middle of the end wall adjacent the top thereof and said one extremity of the third member of each linkage means is pivotally supported on opposite sides of the body near the ends thereof opposite from the end wall of the body adjacent the top thereof, and wherein the cross bars are pivotally supported on opposite sides of the body intermediate the length of the sides, adjacent the top thereof.

8. A mechanism according to claim 4, wherein the members of the linkage means are movable in the same horizontal plane, such that in one lineal position thereof for each set of members the linkage means form substantially a V and after a pivotal movement of the first and second members of the linkage means relative to one another, they assume a position relative to one another such that the first and second members of each linkage means are angularly disposed to one another, and the second and third members of each linkage means moved relatively axially apart so that the linkage means is substantially U-shaped in form.

9. A mechanism according to claim 7, wherein a second pair of cross bars are provided with one bar pivotally supported on one side of the body near the pivotal support of the third member of one linkage means and the other bar pivotally supported on the opposite side of the body near the pivotal support of the third member of the other linkage means, said second pair of cross bars being pivotally movable in a horizontal plane into lineal alignment towards one another and wherein latch means are provided for connecting the second pair of cross bars in lineal aligned position.

10. A mechanism according to claim 8, wherein the cross bars are movable in a plane parallel to the linkage means with the underside of the second member of each linkage means bearing upon the top side of each associated cross bar, and wherein latch means are provided for connecting the cross bars in lineal aligned position.

11. A tarpaulin supporting mechanism, for a vehicle body, having a floor, a pair of parallel and spaced vertical sides and a vertical end wall connected between the sides at one end of the sides, comprising a pair of cross bars having one end of one cross bar pivoted to one side of the body near the top thereof and one end of the other bar pivoted to the other side of the body near the top thereof directly opposite from the pivot of the other bar, said free ends of the bars being pivotally movable towards one another into lineal alignment, means for coupling the bars together in lineal alignment and means secured at one end to the vertical wall and extending the length of the body parallelly disposed to a plane of the top of the end wall and sides of the body and engageably supported upon the top of the end wall and the cross bars.

References Cited in the file of this patent

UNITED STATES PATENTS

| | | |
|---|---|---|
| 2,443,478 | Reid | June 15, 1948 |
| 2,510,307 | Daniels | June 6, 1950 |
| 2,591,050 | Butsch | Apr. 1, 1952 |